US012010028B1

(12) United States Patent
Abdelnasser et al.

(10) Patent No.: US 12,010,028 B1
(45) Date of Patent: Jun. 11, 2024

(54) METHOD AND APPARATUS FOR PROACTIVELY FORMING FLOWLETS FOR A FLOW IN COMMUNICATION NETWORK

(71) Applicant: HUAWEI TECHNOLOGIES CO., LTD., Shenzhen (CN)

(72) Inventors: Amr Adel Nasr Abdelnasser, Vancouver (CA); Xingjun Chu, Kanata (CA); Amir Baniamerian, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/198,357

(22) Filed: May 17, 2023

(51) Int. Cl.
*H04L 47/2416* (2022.01)
*H04L 47/127* (2022.01)
*H04L 47/2483* (2022.01)

(52) U.S. Cl.
CPC ........ *H04L 47/2416* (2013.01); *H04L 47/127* (2013.01); *H04L 47/2483* (2013.01)

(58) Field of Classification Search
CPC ......... H04L 47/00; H04L 47/10; H04L 47/24; H04L 47/2416; H04L 47/12; H04L 47/127; H04L 47/2483
See application file for complete search history.

(56) References Cited

U.S. PATENT DOCUMENTS

| | | | |
|---|---|---|---|
| 10,608,948 B1* | 3/2020 | Leib | H04L 43/065 |
| 11,381,512 B1* | 7/2022 | Kadosh | H04L 41/0806 |
| 11,405,324 B1* | 8/2022 | Segal | H04L 1/08 |
| 2012/0275301 A1* | 11/2012 | Xiong | H04L 47/6295 370/230 |
| 2012/0287787 A1* | 11/2012 | Kamble | H04L 49/201 370/235 |
| 2012/0287939 A1* | 11/2012 | Leu | H04L 49/356 370/409 |
| 2014/0108489 A1* | 4/2014 | Glines | G06F 9/5066 709/201 |
| 2015/0244629 A1* | 8/2015 | Sinha | H04L 49/30 370/236 |
| 2017/0230298 A1* | 8/2017 | Perry | H04L 47/522 |
| 2017/0359261 A1* | 12/2017 | Avci | H04L 45/70 |
| 2019/0058663 A1* | 2/2019 | Song | H04L 47/18 |
| 2023/0198895 A1 | 6/2021 | Baniamerian et al. | |
| 2022/0046465 A1* | 2/2022 | Zhang | H04W 28/0278 |
| 2022/0086080 A1* | 3/2022 | Huang | H04L 47/2483 |

(Continued)

FOREIGN PATENT DOCUMENTS

| | | | | |
|---|---|---|---|---|
| CN | 113872869 A | * | 12/2021 | ............. H04L 47/12 |
| DE | 202018104604 U1 | * | 1/2019 | ............. H04L 43/16 |
| WO | 2022/242170 A1 | | 11/2022 | |

OTHER PUBLICATIONS

W. Li, J. Liu, S. Wang, T. Zhang, S. Zou, J. Hu, W. Jiang, and J. Huang, "Survey on Traffic Management in Data Center Network: From Link Layer to Application Layer," IEEE Access, vol. 9, pp. 38 427-38 456, 2021 2021 IEEE Access pp. 38427-38456.

(Continued)

*Primary Examiner* — Alina A Boutah

(57) ABSTRACT

A method and apparatus for proactively forming flowlets for a flow in a communication network. The method includes monitoring one or more conditions associated with the flow and detecting a trigger signal. Upon detection of activation of the trigger signal, the method further includes transmitting a pause message.

15 Claims, 15 Drawing Sheets

(56) References Cited

U.S. PATENT DOCUMENTS

2022/0124035 A1* 4/2022 Lee ............... H04L 43/0888
2023/0164094 A1* 5/2023 Wu ................. H04L 47/24
                                                       370/235

OTHER PUBLICATIONS

J. Zhang, F. R. Yu, S. Wang, T. Huang, Z. Liu, and Y. Liu, "Load Balancing in Data Center Networks: A Survey," IEEE Communications Surveys Tutorials, vol. 20, No. 3, pp. 2324-2352, 2018 2018 IEEE Communications Surveys Tutorials pp. 2324-2352.
D. Thaler and C. Hopps, "RFC2991: Multipath issues in unicast and multicast next-hop selection," 2000 2000 RFC2991.
S. Kandula, S. Sengupta, A. Greenberg, P. Patel, and R. Chaiken, "The Nature of Data Center Traffic: Measurements Analysis," in Proceedings of the 9th ACM SIGCOMM Conference on Internet Measurement, ser. IMC '09. New York, NY, USA: Association for Computing Machinery, 2009, p. 202-208. 2009 Proceedings of the 9th ACM SIGCOMM Conference on Internet Measurement, ser. IMC '09 p. 202-208.
F. Carpio, A. Engelmann, and A. Jukan, "DiffFlow: Differentiating Short and Long Flows for Load Balancing in Data Center Networks," in 2016 IEEE Global Communications Conference (GLOBECOM), 2016, pp. 1-6 2016 IEEE Global Communications Conference (GLOBECOM) pp. 1-6.
F. Tang, H. Zhang, L. T. Yang, and L. Chen, "Elephant Flow Detection and Load-Balanced Routing with Efficient Sampling and Classification," IEEE Transactions on Cloud Computing, vol. 9, No. 3, pp. 1022-1036, 2021 2021 IEEE Transactions on Cloud Computing pp. 1022-1036.
F. De Pellegrini, L. Maggi, A. Massaro, D. Saucez, J. Leguay, and E. Altman, "Blind, Adaptive and Robust Flow Segmentation in Datacenters," in IEEE Infocom 2018—IEEE Conference on Computer Communications, 2018, pp. 10-18 2018 IEEE Infocom 2018—IEEE Conference on Computer Communications pp. 10-18.
L. Shi, B. Liu, C. Sun, Z. Yin, L. N. Bhuyan, and H. J. Chao, "Load-Balancing Multipath Switching System with Flow Slice," IEEE Transactions on Computers, vol. 61, No. 3, pp. 350-365, 2012 2012 IEEE Transactions on Computers pp. 350-365.
M. Alizadeh, T. Edsall, S. Dharmapurikar, R. Vaidyanathan, K. Chu, A. Fingerhut, V. T. Lam, F. Matus, R. Pan, N. Yadav, and G. Varghese, "CONGA: Distributed Congestion-Aware Load Balancing for Datacenters," SIGCOMM Comput. Commun. Rev., vol. 44, No. 4, p. 503-514, Aug. 2014. 2014 SIGCOMM Comput. Commun pp. 503-514.
E. Vanini, R. Pan, M. Alizadeh, P. Taheri, and T. Edsall, "Let It Flow: Resilient Asymmetric Load Balancing with Flowlet Switching," in Proceedings of the 14th USENIX Conference on Networked Systems Design and Implementation, ser. NSDI'17. USA: Usenix Association, 2017, p. 407-420 2017 Proceedings of the 14th USENIX Conference on Networked Systems Design and Implementation, ser. NSDI'17 pp. 407-420.
X. Diao, H. Gu, X. Yu, L. Qin, and C. Luo, "Flex: A flowlet-level load balancing based on load-adaptive timeout in DCN," Future Generation Computer Systems, vol. 130, pp. 219-230, 2022 2022 Future Generation Computer Systems pp. 219-230.
H. Xu and B. Li, "TinyFlow: Breaking elephants down into mice in data center networks," in 2014 IEEE 20th International Workshop on Local Metropolitan Area Networks (LANMAN), 2014, pp. 1-6 2014 IEEE 20th International Workshop on Local Metropolitan Area Networks (LANMAN) pp. 1-6.
"IEEE Standard for Local and metropolitan area networks—Media Access Control (MAC) Bridges and Virtual Bridged Local Area Networks—Amendment 17: Priority-based Flow Control," IEEE Std 802.1Qbb-2011 (Amendment to IEEE Std 802.1Q-2011 as amended by IEEE Std 802.1Qbe-2011 and IEEE Std 802.1Qbc-2011), pp. 1-40, 2011 2011 IEEE Std 802.1Qbb-2011 (Amendment to IEEE Std 802.1Q-2011 as amended by IEEE Std 802.1Qbe-2011 and IEEE Std 802.1Qbc-2011) pp. 1-40.
W. Xia, P. Zhao, Y. Wen, and H. Xie, "A Survey on Data Center Networking (DCN): Infrastructure and Operations," IEEE Communications Surveys Tutorials, vol. 19, No. 1, pp. 640-656, 2017 2017 IEEE Communications Surveys Tutorials pp. 640-656.
S. Hu, Y. Zhu, P. Cheng, C. Guo, K. Tan, J. Padhye, and K. Chen, "Deadlocks in Datacenter Networks: Why Do They Form, and How to Avoid Them," in Proceedings of the 15th ACM Workshop on Hot Topics in Networks, ser. HotNets '16. New York, NY, USA: Association for Computing Machinery, 2016, p. 92-98 2016 Proceedings of the 15th ACM Workshop on Hot Topics in Networks, ser. HotNets '16 p. 92-98.
Y. Zhu, H. Eran, D. Firestone, C. Guo, M. Lipshteyn, Y. Liron, J. Padhye, S. Raindel, M. H. Yahia, and M. Zhang, "Congestion Control for Large-scale RDMA Deployments," in Proceedings of the 2015 ACM Conference on Special Interest Group on Data Communication, ser. SIGCOMM '15. New York, NY, USA: Association for Computing Machinery, 2015, p. 523-536 2015 Proceedings of the 2015 ACM Conference on Special Interest Group on Data Communication, ser. SIGCOMM '15 pp. 523-536.
Yuanwei Lu, Guo Chen, Bojie Li, Kun Tan, Yongqiang Xiong, Peng Cheng, Jiansong Zhang, Enhong Chen, and Thomas Moscibroda. 2018. Multi-path transport for RDMA in datacenters. In Proceedings of the 15th USENIX Conference on Networked Systems Design and Implementation (NSDI'18). USENIX Association, USA, 357-371 2018 Proceedings of the 15th USENIX Conference on Networked Systems Design and Implementation (NSDI'18). USENIX Association pp. 357-371.

* cited by examiner

| Pause time (μs) | | 150 | | | | | | |
|---|---|---|---|---|---|---|---|---|
| Flowlet gap (μs) | | 75 | | | | | | |
| | | Letflow+Flowlets on Demand | | | ECMP | | LetFlow | |
| | Flows | FCT (ms) | Throughput (Gbps) | | FCT (ms) | Throughput (Gbps) | FCT (ms) | Throughput (Gbps) |
| Eleph Flows | Eleph-Flow1 | 585.376 | 4.442 | | 723.387 | 3.195 | 652.041 | 3.540 |
| | Eleph-Flow2 | 571.854 | 4.898 | | 713.288 | 3.245 | 668.470 | 3.570 |
| | Eleph-Flow3 | 582.602 | 6.285 | | 753.343 | 3.917 | 708.609 | 4.336 |
| | Eleph-Flow4 | 608.428 | 4.990 | | 417.676 | 7.541 | 430.731 | 7.639 |
| | Mean | 587.065 | 5.154 | | 651.923 | 4.475 | 614.963 | 4.771 |
| Mice Flows | Mean FCT (μs) | 210.593 | | | 215.281 | | 210.526 | |
| | 95%tile FCT (μs) | 427.240 | | | 419.634 | | 429.626 | |
| | 99%tile FCT (μs) | 3967.823 | | | 4090.497 | | 3950.611 | |

FIG. 11

METHOD AND APPARATUS FOR PROACTIVELY FORMING FLOWLETS FOR A FLOW IN COMMUNICATION NETWORK

CROSS-REFERENCE TO RELATED APPLICATIONS

This is the first application filed for the present invention.

FIELD

The present disclosure pertains to data center networks and in particular to a method and apparatus for proactively forming flowlets for a flow in a communication network of a data center network.

BACKGROUND

Recently, there has been a dramatic increase in services including search, storage, and computing. Therefore, the deployment of largescale data center networks (DCNs) has expanded significantly in order to accommodate these increasing services. These largescale DCNs can include thousands of servers that are connected via multi-tier switch networks. In such datacenter networks, it can be common to find multiple paths connecting any pair of server nodes. In order to provide cost-effective execution of tasks and suitable utilization of resources, it is desired that data being moved between the server nodes is mapped to the available paths in a fair and efficient manner. As such it can be necessary to balance the load associated with this data movement across the multiple available paths. In this context, load balancing techniques can play an important role.

Equal-cost multi-path routing (ECMP) has been widely deployed as a load balancing mechanism to distribute traffic or load among the different equal-cost paths that are available. ECMP uses a static hashing mechanism that hashes some fields in the packet headers and then uses the hash value to select one of the equal-cost paths. However, it is noted that DCNs have a special topology and unique traffic characteristics. More specifically, traffic in DCNs can be classified into two types of traffic which have different characteristics. These two types of traffic are termed elephant flows and mice flows. Mice flows include delay sensitive short messages, which are usually small in size and have a bursty pattern. Elephant flows are throughput-sensitive and usually last for a long duration of time. In DCNs, a scheme like ECMP can be problematic due to the fact that ECMP does not differentiate between delay-sensitive mice flows and throughput-sensitive elephant flows. As such mice flows may be queued behind elephants and blocked, thus suffering from long flow completion times. In addition, ECMP may suffer from hash collisions and can end up scheduling multiple elephant flows on the same path. This type of scheduling can result in an inefficient use of the available bandwidth and can lead to bottlenecks in the network where some links overloaded while other links may be free. In addition, traditional load balancing schemes cannot be reused due to DCNs unique traffic characteristics.

In order to accommodate different traffic conditions in DCNs, some load balancing schemes differentiate between the different flow types and treat the different flow types differently. For example, a scheme called DiffFlow detects long elephant flows and forwards the elephant flow packets using random packet spraying (RPS). As is known, RPS directs packets to a plurality of links. However, small mice flows are forwarded with ECMP. However, this load balancing scheme suffers from out-of-order problems associated with the packets for the elephant flows.

Another approach uses efficient sampling and classification approach (ESCA) which detects elephant flows quickly and accurately with low bandwidth consumption. After identifying the elephant and mice flows, load balancing routing (LBR) is enabled which sets paths for elephant and mice flows with different mechanisms so that mice flows will not be blocked by elephant flows. More specifically, elephant flows can be assigned to paths that have sufficient bandwidth to satisfy their throughput demands. On the other hand, mice flows are assigned to paths with the least congestion.

In order to decrease the load on a software defined network (SDN) controller in a DCN, an algorithm has been defined that can learn the optimal segmentation threshold for differentiating between elephant and mice flows. With this scheme, the SDN controller is invoked to choose an optimized path and install forwarding rules in switches only when a new elephant flow is detected. However, this scheme is oblivious to flow size distribution and robust to traffic classification errors.

Other load balancing schemes followed a different approach by breaking down large flows into smaller ones, called flowlets, in order to perform load balancing at a finer granularity and improve efficiency. For instance, a scheme called flow slice has been defined which cuts off each flow into smaller ones, whenever the gap between the packets belonging to a certain flow is greater than a certain threshold.

A distributed, congestion-aware load balancing scheme termed CONGA has been defined for DCNs. CONGA splits flows into smaller ones called flowlets and, based on the estimated path congestion reported by switches in the network, chooses the best path.

As another example. LetFlow is a load balancing scheme in which flows are also broken down into flowlets. LetFlow then selects paths at random for the resulting flowlets. The scheme then depends on the elasticity property of flowlets, in which the size of flowlets changes automatically based on traffic conditions on the path in order to balance the traffic on different paths. Although breaking up the flows into flowlets helps mitigate the out-of-order problem, the above schemes are reactive in terms of their flow splitting mechanisms. More specifically, these schemes wait until the inter-packet gap (IPG) is greater than a sufficient gap, called the "flowlet timeout", to break big flows into smaller ones.

Another load balancing solution is termed Flex, which is a host-based load balancing solution that works with flowlets. However, instead of using a fixed value for the flowlet time timeout parameter, Flex uses a dynamic value that changes according to the paths conditions. Furthermore, Flex maintains a separate flowlet timeout value for each flow. After detecting an elephant flow, Flex splits the elephant flow into flowlets based on current timeout value. Subsequently, Flex marks the adjacent flowlets of the same flow using one bit of the reserved field in the transmission control protocol (TCP) header to ensure that the switch can detect a flowlet and distinguish the flowlet from a previous flowlet. However, this scheme requires changes at the end-host side.

Another solution is termed TinyFlow, which is a load balancing scheme in which elephant flows are broken down into equal sized mice flows. The resulting mice flows are then distributed randomly over plural available paths. However, this scheme suffers from the problems wherein mice flows created from an elephant flow suffer from packet re-ordering.

Therefore, there is a need for a method and apparatus for proactively forming flowlets for a flow in a communication network that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present disclosure is to provide a method and apparatus for proactively forming flowlets for a flow in a communication network.

In accordance with embodiments, there is provided a method for proactively forming flowlets for a flow in a communication network. The method includes monitoring one or more conditions associated with the flow and detecting a trigger signal. Upon detection of activation of the trigger signal, the method further includes transmitting a pause message.

In some embodiments, the trigger signal is at least in part based on congestion detection. In some embodiments, the trigger signal is at least in part based on a size of the flow. In some embodiments, the size of the flow is evaluated subsequent to flowlet creation. In some embodiments, the size of the flow is defined based on a number of packets or a number of bytes.

In some embodiments, the pause message is a priority base flow control (PFC) message. In some embodiments the PFC message includes a priority enabled vector (PEV) field, wherein the PEV field is indicative of activation of the method for proactively forming flowlets for a flow in a communication network. In some embodiments, the PFC message includes a time vector, wherein the time vector is indicative of a pause duration. In some embodiments, the pause duration is greater than or equal to a flowlet timeout value.

In accordance with embodiments, there is provided a device for proactively forming flowlets for a flow in a communication network. The device includes a processor and a non-transitory memory storing machine executable instructions. The instructions, when executed by the processor configure the device to monitor one or more conditions associated with the flow and detect a trigger signal. Upon detection of activation of the trigger signal, the instructions when executed by the processor further configure the device to transmit a pause message.

In some embodiments, the trigger signal is at least in part based on congestion detection. In some embodiments, the trigger signal is at least in part based on a size of the flow. In some embodiments, the size of the flow is evaluated subsequent to flowlet creation. In some embodiments, the size of the flow is defined based on a number of packets or a number of bytes.

In some embodiments, the pause message is a priority base flow control (PFC) message. In some embodiments, the PFC message includes a priority enabled vector (PEV) field, wherein the PEV field is indicative of activation of the method for proactively forming flowlets for a flow in a communication network. In some embodiments, the PFC message includes a time vector, wherein the time vector is indicative of a pause duration.

In some embodiments, the pause duration is greater than or equal to a flowlet timeout value.

In some embodiments, the device is a top of the rack (TOR) switch.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present disclosure will become apparent from the following detailed description, taken in combination with the appended drawings, in which:

FIG. 11 illustrates comparison data for different load balancing methods enabling comparison with a method for breaking packet flows, according to embodiments.

DETAILED DESCRIPTION

It has been realised that for prior art methods which work at the granularity of flowlets, a problem is that these methods are passive when it comes to the way flowlets are formed. In other words, methods of the prior art that work with flowlets wait until there is enough duration in time between 2 consecutive data packets which is greater than the flowlet timeout to form flowlets. This type of method can be considered to work best when the data packet traffic is bursty.

Figure 1:
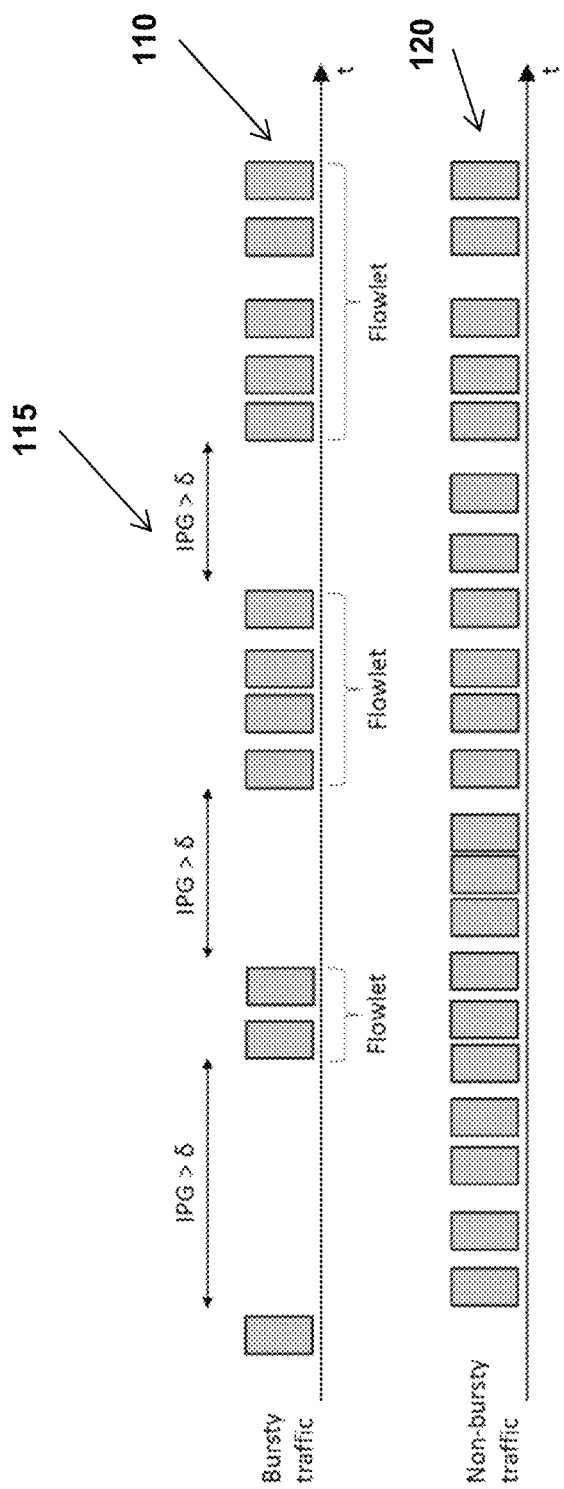
FIG. 1 illustrates a timeline example of bursty data packet traffic and an example of non-bursty data packet traffic.

FIG. 1 shows the case for bursty data packet traffic 110 and non-bursty data packet traffic 120. Within the bursty data packet traffic, it is further illustrated normal flowlet operation. Whenever the interpacket gap (IPG) 115 between 2 consecutive packets is greater than the flowlet timeout δ, a new flowlet can be formed, which can provide more granularity for an efficient operation of load balancing or congestion control. This flowlet formation depends on the bursty nature of the data packet traffic. As noted above, problems occur with flowlet formation when there is a continuous stream of non-bursty data packets 120. As illustrated in FIG. 1, in non-bursty data packet traffic 120 whenever the IPGs between consecutive packets is less than δ (<δ), flowlets cannot be formed. This type of situation can be referred to as flowlet hostile. It has been realised that in such a flowlet hostile situation no action with respect to load balancing or congestion control can be taken until a new flowlet has been created. In the worst case, non-bursty data packet traffic can downgrade a flowlet based load balancing or congestion control solution back to a flow based solution which essentially nullifies the value of a flowlet approach for load balancing or congestion control.

According to embodiments, in order to improve the efficiency of a flowlet-based mechanism, whether it is being used for load balancing or congestion control, an add-on mechanism is provided wherein the network can proactively form flowlets when needed. This proactive nature can be advantageous as this enables the network to change the characteristics of data parent traffic in the presence of congestion, while further acting promptly. In this manner the network can react upon detection that a problem has occurred and thus not have to wait for flowlets to form passively, namely by themselves. In some embodiments, the add-on mechanism can be configured as an in-network solution that does not necessitate changes or modifications at the end-host side.

Figure 2:
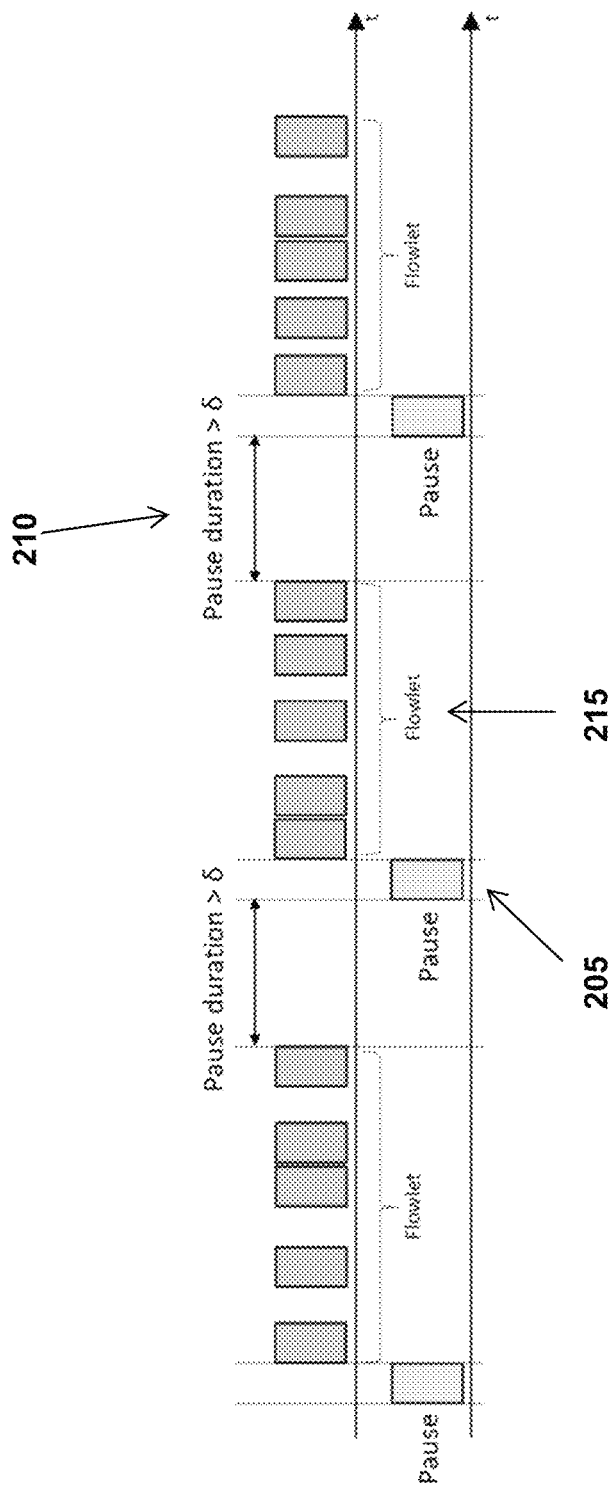
FIG. 2 illustrates a timeline of data packet traffic including receipt of a pause message according to embodiments.

It has been realised that in order to overcome the problem described in FIG. 1, a more proactive approach for flowlet formation is illustrated in FIG. 2. More specifically, the network can send pause messages 205 to the sending end hosts, (which may be interchangeable termed the sending node or the end node or the end host), wherein these pause messages cause the sending node to stop transmission for a duration of time that is greater than the flowlet timeout δ 210. The sending node can cease transmission for the specified duration and then resume transmission when the pause duration expires. These pause messages cause the interpacket gap (IPG) to be greater than δ, thus permitting the formation of flowlets 215. By sending pause message 205 to the sending node, wherein the pause duration is defined as being greater than δ, the IPG is forced to be greater than δ, resulting in the formation of flowlets.

According to embodiments, the network can send a pause message to the end host, end node or sending node leading to the formation of a new flowlet according to a variety of conditions. For example, the network can send a pause message when network congestion has occurred or been detected and an existing load balancing mechanism needs to react promptly, thereby at least in part enabling the end host to continue transmitting the rest of an existing flow on a less congested or utilized path rather than waiting for the passive formation of a flowlet.

Figure 3:
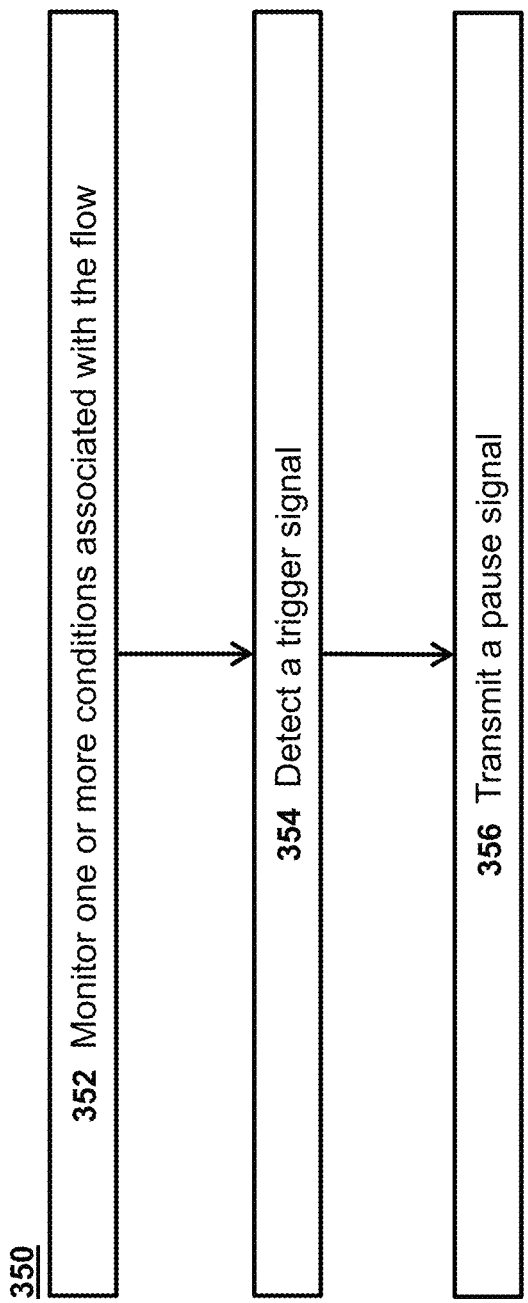
FIG. 3 illustrates a method for breaking packet flows using a proactive pause message, according to embodiments.

FIG. 3 illustrates a method for breaking packet flows using proactive pause messaging, according to embodiments. The method includes monitoring one or more conditions associated with the flow and detecting a trigger signal. Upon detection activation of the trigger signal, the method further includes transmitting a pause message. According to some embodiments the trigger signal is at least in part based on one or more of congestion detection and the size of the flow.

According to some embodiments, the size of the flow is evaluated subsequent to flowlet creation. According to some embodiments, wherein the size of the flow is defined based on a number of packets or a number of bytes.

According to some embodiments, the pause message is a priority base flow control (PFC) message. According to some embodiments, the PFC message includes a priority enabled vector (PEV) field, wherein the PEV field is indicative of activation of the method for proactively forming flowlets for a flow in a communication network. According to some embodiments, the PFC message includes a time vector, wherein the time vector is indicative of a pause duration. According to some embodiments, the pause duration is greater than or equal to a flowlet timeout value.

According to embodiments, the use of the network initiated transmission of a pause message can be configured as an add-on to a flowlet based mechanism associated with a data center network (DCN).

A mechanism by which the network can instruct an end-host to pause transmission for a specified duration of time is desired. In some embodiments, mechanism associated with the pause message is a newly configured message protocol that can be added the configuration of the network. In some embodiments, a mechanism associated with the pause message results in minimal changes to current network configuration.

Figure 4:
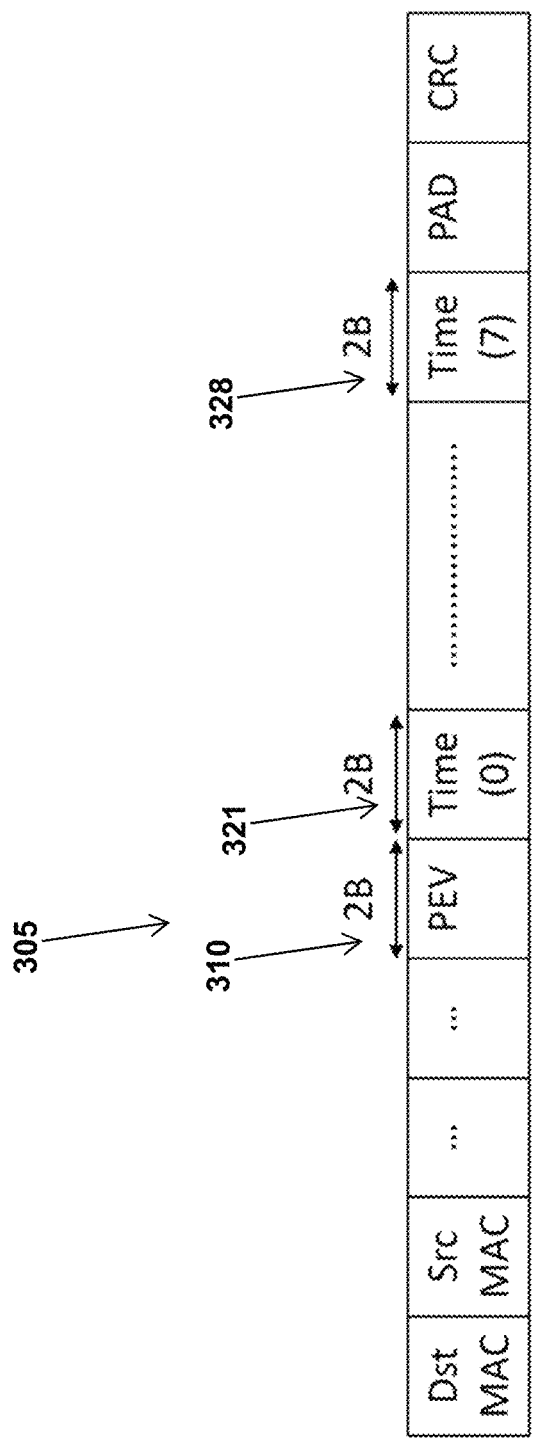
FIG. 4 illustrates a format of a priority based flow control (PFC) message for use of pausing data packet traffic, according to embodiments.

In some embodiments, a message that can be used by the network to instruct a sending node (or end node) to pause transmission is the priority flow control (PFC) pause message which is used by the PFC protocol. The PFC protocol allows a near-end system to transmit a pause message to a far-end system to tell the far end system to stop transmitting frames. FIG. 4 illustrates the format of a PFC message.

According to some embodiments, the relevant fields of a PFC message that would be applicable for use with the pause mechanism for proactively forming flowlets includes the priority enable vector (PEV) field 310 and the time vector 321 to 328. The PEV 310 is composed of 2 octets where the $n^{th}$ bit e(n) of the least significant octet refers to priority queue n. The time vector is composed of eight 2 octets fields labeled Time(0) 321 to Time(7) 328. In the time vector, a value Time(n) indicates the pause duration for the priority queue n. This pause duration Time(n) is active only if the corresponding bit e(n) in the PEV is set. Accordingly, in order to pause the transmission from a certain sending end host (or end node), the network sends a PFC pause message with a pause duration Time(n)=Δ, where Δ>δ. As such, the pause duration (Δ) assigned to the time field is greater than or equal to the flowlet timeout ($\delta$). The use of the PFC message as the pause message necessitates substantially without any network modifications or additional messages defined being defined.

Figure 5:
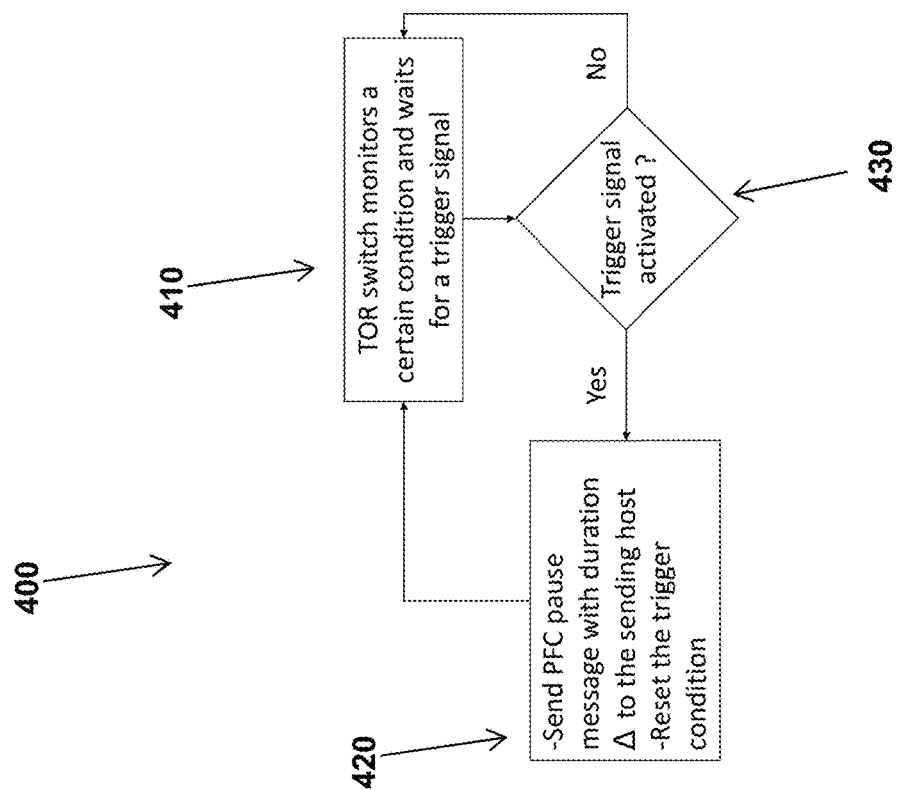
FIG. 5 illustrates a method for breaking packet flows using a pause message, according to embodiments.

FIG. 5 illustrates a method 400 for breaking packet flows using a pause message, according to embodiments. It is desired that large elephant flows or flows with a long continuous stream of packets, with slim chances of flowlet formation are broken up into smaller flowlets that can be easier to manage for load balancing. It is further desired that small mice flows are not broken up. As illustrated in FIG. 5, the top of the rack (TOR) switch monitors a certain condition in the network and waits for a trigger signal 410. The TOR switch checks whether the trigger signal has been activated or not 430. The trigger signal can be indicative of one or more of a limitation on maximum flowlet size, a congestion flag for a certain path or other criteria that may require the flow to be broken up into flowlets. If the trigger signal has not been activated, the method returns to the TOR switch monitoring a certain condition 410. Once the trigger signal is activated, the TOR switch sends a PFC pause message 420 to the host node (or the sending node, end node or the like) wherein the pause duration ($\Delta$) is greater than the flowlet timeout ($\delta$) and resets the trigger condition. The TOR switch subsequently returns to the monitoring a certain condition 410. Upon receipt of the pause message, the host node (or sending node or end node) pauses transmission and once the pause duration expires, it resumes transmission. According to some embodiments, the pause message can be configured as a PFC message.

According to embodiments, the trigger signal can be configured as condition that needs an immediate action from the network rather than waiting for passive flowlet creation. Possible trigger conditions can include one or more of a maximum desired flowlet size in the network and congestion identified on a certain path. Other suitable trigger conditions would be readily understood by a worker skilled in the art.

Figure 6:
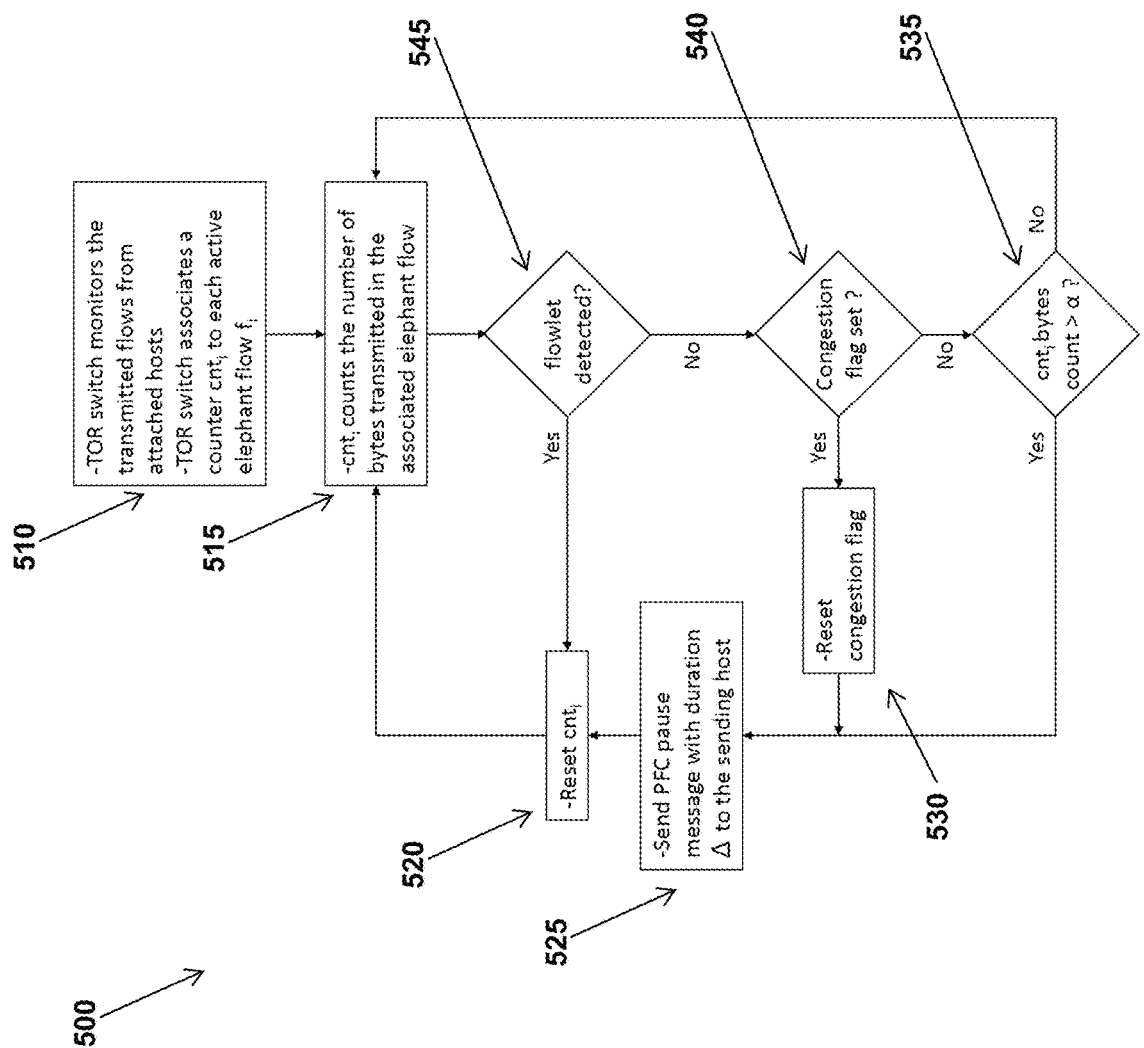
FIG. 6 illustrates another method for breaking packet flows using a pause message, according to embodiments.

FIG. 6 illustrates another method 500 for breaking packet flows using a pause message, according to embodiments. According to embodiments, both congestion and the maximum flowlet size can be used trigger signals for breaking big flows (e.g. elephant flows) into flowlets. However, it will be readily understood that this method may be adjusted such that only congestion signals or maximum flowlet size is used as a trigger signal.

According to embodiments, counters (cnt) are maintained for each elephant flow $f_i$. It is understood that in DCNs, the typical number of elephant flows is relatively small and thus maintaining a counter for each flow is achievable. The TOR switch monitors the transmitted flows 510 from the end hosts and associates a counter $cnt_i$ to each elephant flow $f_i$ that is detected. The TOR switch increments 515 counter $cnt_i$ for each packet received from flow $f_i$. The TOR switch checks 545 if a flowlet is detected for flow $f_i$. If true, the TOR switch resets 520 counter $cnt_i$ for flow $f_i$ and proceeds to repeat 515. If false, the TOR switch checks if a congestion flag 540 involving flow $f_i$ has been set. If true, the TOR switch resets 530 the congestion flag, and sends a pause message with duration $\Delta$ to the sending node (or end node) that is transmitting flow $f_i$. The TOR switch additionally resets the counter $cnt_i$ for flow $f_i$. The method returns to 515. If the congestion flag is not set, the TOR switch moves to 535. It is to be understood that if there another elephant flows $f_j$ that is simultaneously being transmitted by the same end node transmitting $f_i$ and flow $f_j$ has the same priority as flow $f_i$, the counter associated $cnt_j$ of flow $f_j$ will also be reset. Proceeding from the determination that the congestion flag is not set, the TOR switch checks if $cnt_i > \alpha$, wherein $\alpha$ can be considered to be a threshold for the number of packets (or bytes) transmitted without the creation of a flowlet. If this is determined to be true, the TOR switch sends a pause message defining duration $\Delta$ to the end host transmitting flow $f_i$ and resets counter $cnt_i$ for flow $f_i$. The TOR switch subsequent returns to counting 515. If $cnt_i$ in not greater than $\alpha$, TOR switch subsequent returns to counting 515. It is to be noted that if there are other elephant flows $f_j$ that are simultaneously transmitted by the same end host transmitting $f_i$ and $f_j$ has the same priority as flow $f_i$, the counter $cnt_j$ will also be reset.

According to embodiments, the parameter $\Delta$ is selected such that the value of $\Delta$ is greater than the flowlet timeout value $\delta$. It is to be understood that the flowlet timeout value $\delta$ can be obtained with reference to the existing flowlet based solutions. For example, flowlet timeout value $\delta$ can be based on the worst case of round trip time (RTT) difference between different paths to substantially guarantee that no packet re-ordering issues arise with flowlet switching. In some embodiments, the minimum value for the parameter $\Delta$ can be set equal to $\delta$. However, it will be readily understood that when the parameter $\Delta$ is set to be greater than $\delta$, it is even less likely that packet re-ordering issues arise.

One load balancing method that uses flowlets is termed LetFlow which works by detecting flowlets and for any detected flowlet, LetFlow assigns that flowlet a path at random. It is foreseen that by integrating a method for breaking packet flows using a pause message according to embodiments of the instant application, the performance of LetFlow can be improved. Through the integration of a method for breaking packet flows using a pause message according to embodiments of the instant application, LetFlow is provided with the capability of proactively forming flowlets, rather than passively waiting for the flowlets to occur.

Figure 7A:
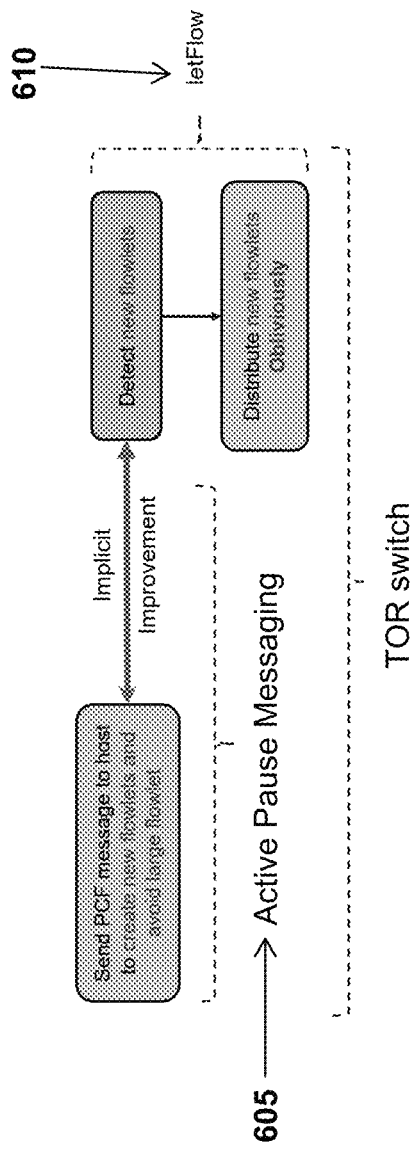
FIG. 7A illustrates a schematic for integration a pause message for modifying data packet traffic into LetFlow, according to embodiments.

FIG. 7A illustrates a schematic for integration of proactive pause messaging for modifying data packet traffic into LetFlow, according to embodiments. The proactive pause messaging 605 according to embodiments of the instant application, can be integrated in LetFlow 610 as illustrated.

Figure 7B:
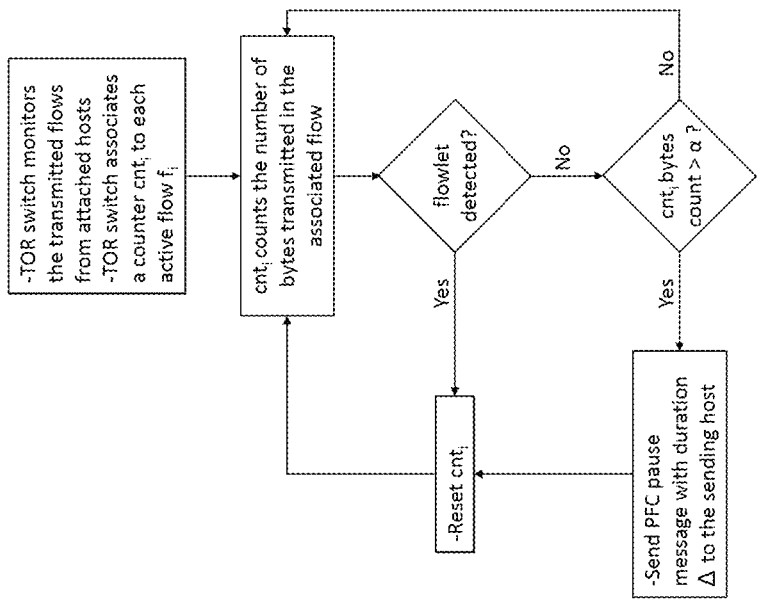
FIG. 7B illustrates a method for breaking packet flows for modifying data packet traffic that can be added to the current features LetFlow, according to embodiments.

FIG. 7B illustrates a method for breaking packet flows for modifying data packet traffic that can be added to the current features LetFlow, according to embodiments. It is noted that the method illustrated in FIG. 7B is defined in further detail above with respect to FIG. 6.

According to embodiments, the parameter $\alpha$ is an engineering design parameter that can be set to avoid small flow slicing, namely proactively creating flowlets when the flow is already relatively small. The parameter $\alpha$ can be configured or selected before integration of the proactive pause messaging. In some embodiments, the parameter $\alpha$ can be determined during operation through flow size distribution and other optimizing methods. For example, $\alpha$ can be set as the 99$^{th}$ percentile of mice flow sizes in the DCN network. By selecting $\alpha$ in this manner, substantially all flowlets in the network will look like mice flows. As another example, $\alpha$ can be set to be much greater than the largest mice flow in the network. In this manner, there is a substantial minimization of the chance that a mice flow is paused or sliced by a method according to embodiments.

Figure 8A:
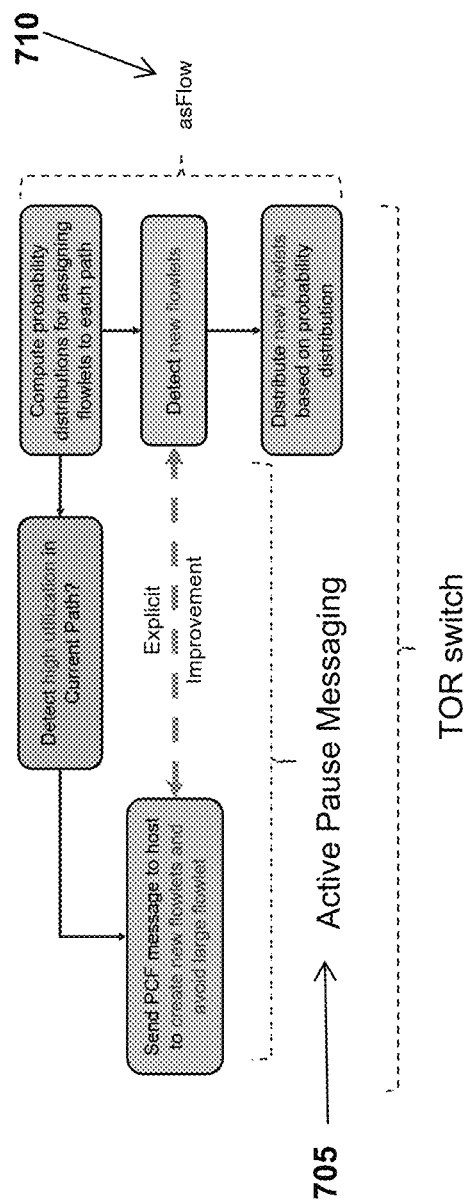
FIG. 8A illustrates a schematic for integration a pause message for modifying data packet traffic into asFlow, according to embodiments.

FIG. 8A illustrates a schematic for integration a pause message for modifying data packet traffic into asFlow, according to embodiments. The proactive pause messaging 705 according to embodiments of the instant application, can be integrated in asFlow 710 as illustrated.

Figure 8B:
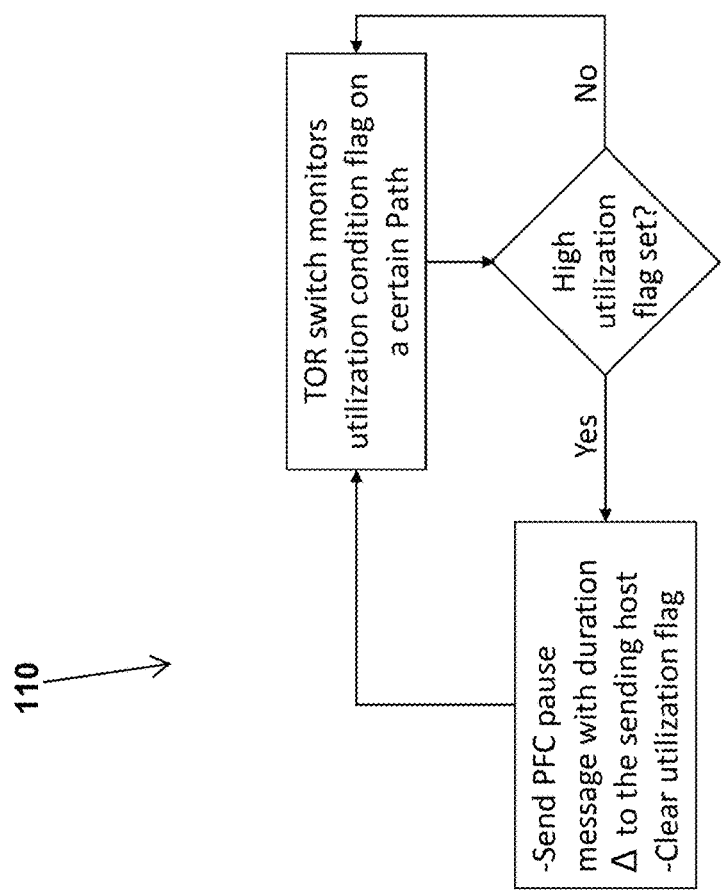
FIG. 8B illustrates a method for breaking packet flows for modifying data packet traffic that can be added to the current features of asFlow, according to embodiments.

FIG. 8B illustrates a method for breaking packet flows for modifying data packet traffic that can be added to the current features of asFlow, according to embodiments. It is noted that the method illustrated in FIG. 8B is defined in further detail above with respect to FIG. 5.

Figure 9:
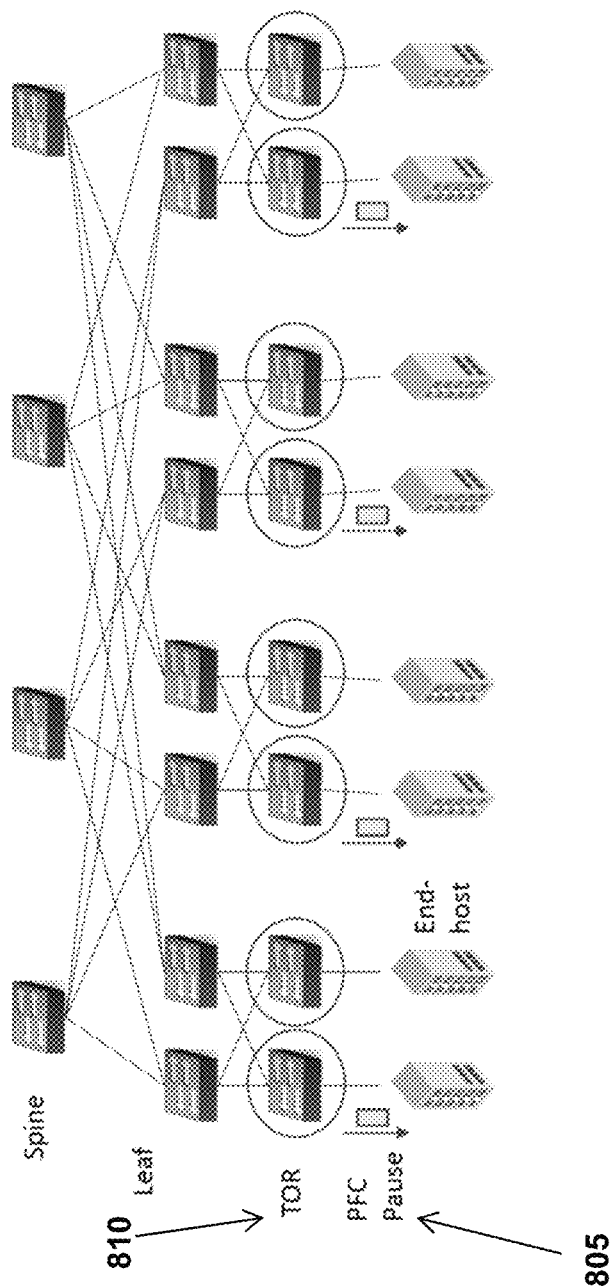
FIG. 9 illustrates an example of a data center network (DCN) deployed using the fat-tree topology integrating a method for breaking packet flows, according to embodiments.

FIG. 9 illustrates an example of a data center network (DCN) deployed using the fat-tree topology integrating a method for breaking packet flows, according to embodiments.

In this example, the proactive pause mechanism according to embodiments, that is configured to break the flows into flowlets is only enabled at the top of rack (TOR) switches 810. Whenever needed, TOR switches 810 will send PFC pause messages 805 to the connected end-hosts leading them to pause transmission for the duration indicated in the pause message. As previously discussed, the proactive pause messaging can be configured using a PFC pause message. It is to be understood that unless the proactive pause messaging is enabled in all the switches in the topology illustrated in FIG. 9, enabling the proactive pause mechanism only at the TOR switches can guarantee the following features. Since proactive pause mechanism is only enabled at the TOR switches and these switches do not form a loop, there is essentially zero chance of a cyclic buffer dependency taking place. As such, there is essentially no possibility of deadlocks taking place. Another feature associated with enabling the proactive pause mechanism only at the TOR switches is that when the pause message is a PFC pause message, the cascading effects of PFC pause frames, where PFC pause messages sent by one switch trigger the PFC pause messages generation in other switches, do not take place. Hence, there will be no PFC storms. Another feature associated with enabling the proactive pause mechanism only at the TOR switches is that there is minimized head of line blocking and victim flow problems. It is understood that victim flow problems are now confined to end hosts which transmit multiple flows simultaneously. Victim flow problems can be eliminated by modifying the proactive pause message to carry flow information, however it is understood that for this to be enabled, configuration modifications of the end host would likely be required.

According to embodiments, the method of proactive pause messaging is an in-network solution that requires substantially no modifications at the end-host or on the network side. On the network side, maintaining a counter at the TOR switches for elephant flows which are typically low, since the number of elephant flows usually constitute a small proportion of the flows in a DCN network. In addition, the method of proactive pause messaging can be used as an add-on to existing flowlet based congestion control or load balancing schemes to improve their performance by maintaining the flowlet granularity required by these mechanisms. Furthermore, the method of proactive pause messaging gives the network the capability to maintain a certain distribution of the size of flows being transmitted through the network.

According to embodiments, benefits of the method of proactive pause messaging can provide benefits that can include one or more of: 1) in-network solution which avoids the out of order problem and that is more accurate than host based solutions in terms of timing; 2) can be configured to use an already existing mechanism (PFC protocol) and therefore, minimal changes are needed in the network: 3) only enabled between TOR switch and network interface card (NIC) and thus there is no chance for deadlock formation and the head of line blocking (HOL) problem is minimized; 4) no traffic dependency as the method is proactive; 5) substantially maximizes flowlet solutions benefit; and 6) enables DCN providers to offer better services with performance guarantees.

According to embodiments, the methods of the instant application can proactively break big flows with non-bursty streams of packets into smaller flows, wherein it forms flowlets on demand, for example on an as needed basis. According to embodiments, the methods of the instant application can be configured as an add-on to existing flowlet based congestion control or load balancing schemes. The methods of the instant application can improve the performance existing flowlet based congestion control or load balancing schemes by maintaining the flowlet granularity required by these mechanisms.

According to embodiments, the use of a defined PFC mechanism for the creation of a pause message for breaking large flows into flowlet friendly traffic has been provided. This may be considered as an in-network solution that requires substantially no modifications at the end-host or at the network side.

According to embodiments, the methods of the instant application can use one or more of congestion and maximum flowlet size as trigger signals for the transmission of a pause message. It will be readily understood that trigger signals based one or more other parameters can be used, in conjunction with or as an alternative to congestion and maximum flowlet size.

According to embodiments, the methods of the instant application typically does not suffer from packet re-ordering problems seen in the prior art. The methods of the instant application typically do not require extra processing and computations at the receiving end-host to re-order the received out of order packets.

According to embodiments, the methods of the instant application can provide the network with the capability of maintaining a certain distribution of the size of the flows flowing through the network. As such, the instant methods may provide better control of the traffic and more efficient distribution across the available network paths.

Figure 10:
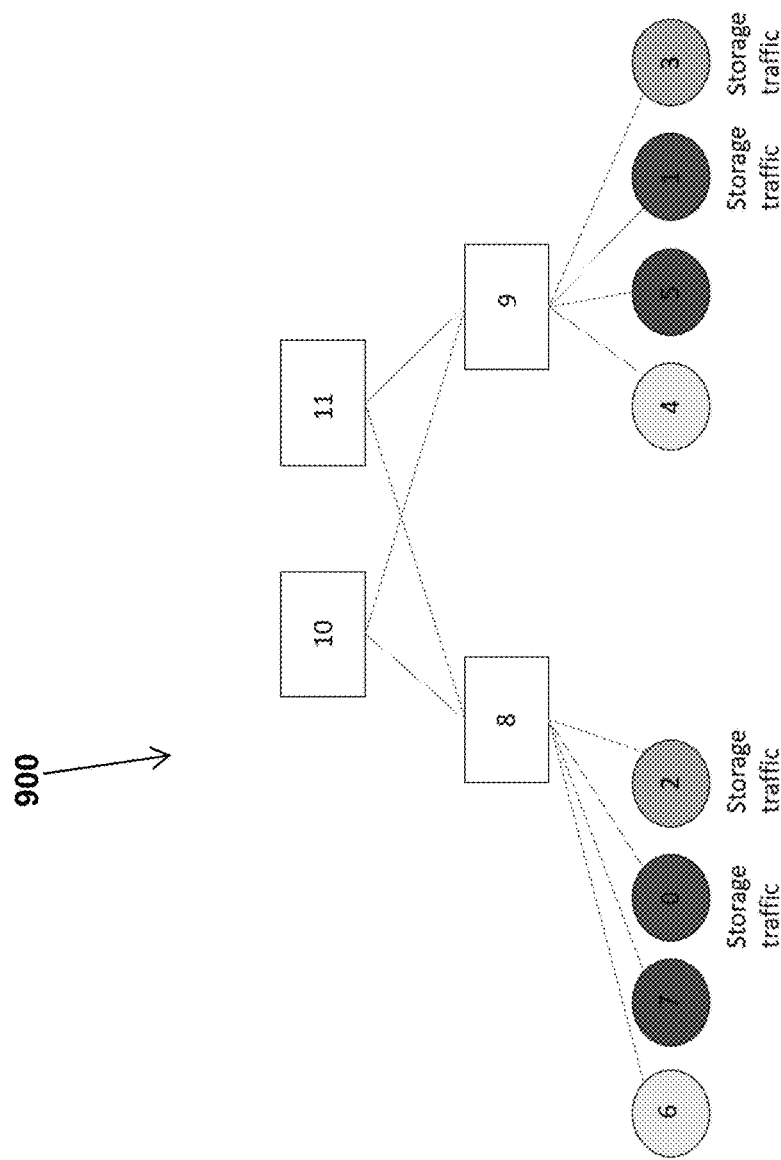
FIG. 10 illustrates a network topology used for generating performance data when using a method for breaking packet flows, according to embodiments.

FIG. 10 illustrates a network topology 900 used for generating performance data when using a method for breaking packet flows, according to embodiments. In the illustrated topology, end nodes 0, 1, 2, 3, 4, 5, 6, 7 are considered as end nodes, which are performing the transmission of one or more flows. In addition, nodes 8 and 9 can be considered as the TOR switches and nodes 10 and 11 can be representative of a leaf or spine of the network. FIG. 11 illustrates comparison data for different load balancing methods enabling comparison with a method for breaking packet flows, according to embodiments. The method that are compared in FIG. 11 include (ECMP), (LetFlow+Flowlets on Demand), and (LetFlow). It is understood that flowlets on demand is a method according to embodiments of the present disclosure.

The network configuration in FIG. 10 is used in order to evaluate the performance of flowlets on demand (proactive flowlet formation) when used as an add-on to an existing load balancing mechanism, and in this instance the load balancing mechanism is defined as LetFlow. As such, the performance of LetFlow as is currently deployed is compared with the combination of LetFlow with proactive pause messaging according to embodiments, wherein PFC pause messages are used to create flowlets when required. Furthermore, for further comparison, evaluations of network operation according to ECMP is also provided, wherein it is understood that ECMP is widely deployed in DCNs.

For this simulation, for each of the cases "LetFlow+ flowlets on demand"; "LetFlow" and "ECMP" the scenario of flow transmission is summarized as follows:
1) 4 elephant flows of size 250 MBs are transmitted from nodes 6→4, 7→5, 0→1, and 2→3;
2) Approximately 1600 overlapping mice flows (each <2 MB), are also transmitted in the network, wherein these mice flows are transmitted between nodes 0, 2, 1, and 3;
3) remote direct memory access (RDMA) traffic with data center quantized congestion notification (DCQCN) and PFC are enabled;
4) The threshold for sending the PFC pause message and slicing the elephant flows is 50 MB, namely α=50 MB;
5) The pause duration (Δ) is 150 μs in the PFC pause messages and the flowlet timeout (δ) is 75 μs Upon review of FIG. 11, for the elephant flows, it can be observed that "LetFlow+Flowlets on Demand" is better than "Letflow" alone in terms of higher mean throughput and lower mean flow completion time (FCT). Both "LetFlow+ Flowlets on Demand" and "Letflow" are better than "ECMP". Namely the performance of (LetFlow+Flowlets on Demand) better than (LetFlow) better than (ECMP).

It is considered that one or more of the following may be considered as a reason for the above performance. 1) With "ECMP", the allocation of flows to the available paths remains the same throughout the lifetime of the flow; 2) "Letflow" can change this consistent allocation by exploiting flowlet gaps (for example, "LetFlow" is capable of changing the initial assignment of the elephant flows to other paths whenever possible); 3) Flowlets on demand adds proactive flowlet creation to the "LetFlow" mechanism. As such, flowlets are not passively created but proactively created when needed, since flowlets on demand forces the creation of flowlets.

Having regard to the impact of "proactive flowlet formation" on the mice flows and the victim flow problem, suitably selecting the threshold a, the victim flow issue can be mitigated. It can be observed that very slight variations in the mean, 95 percentile FCT and 99 percentile FCT for the mice flows when comparing the different methods evaluated. The threshold a for sending the pause message and slicing the elephant flows is significantly bigger than the maximum mice flow size. As such, very few mice flows are affected by the pause messages and the victim flow problem can be substantially minimized.

Embodiments of the present disclosure can be implemented using electronics hardware, software, or a combination thereof. In some embodiments, the method is implemented by one or multiple computer processors executing program instructions stored in memory. In some embodiments, the method is implemented partially or fully in hardware, for example using one or more field programmable gate arrays (FPGAs) or application specific integrated circuits (ASICs) to rapidly perform processing operations.

Figure 12:
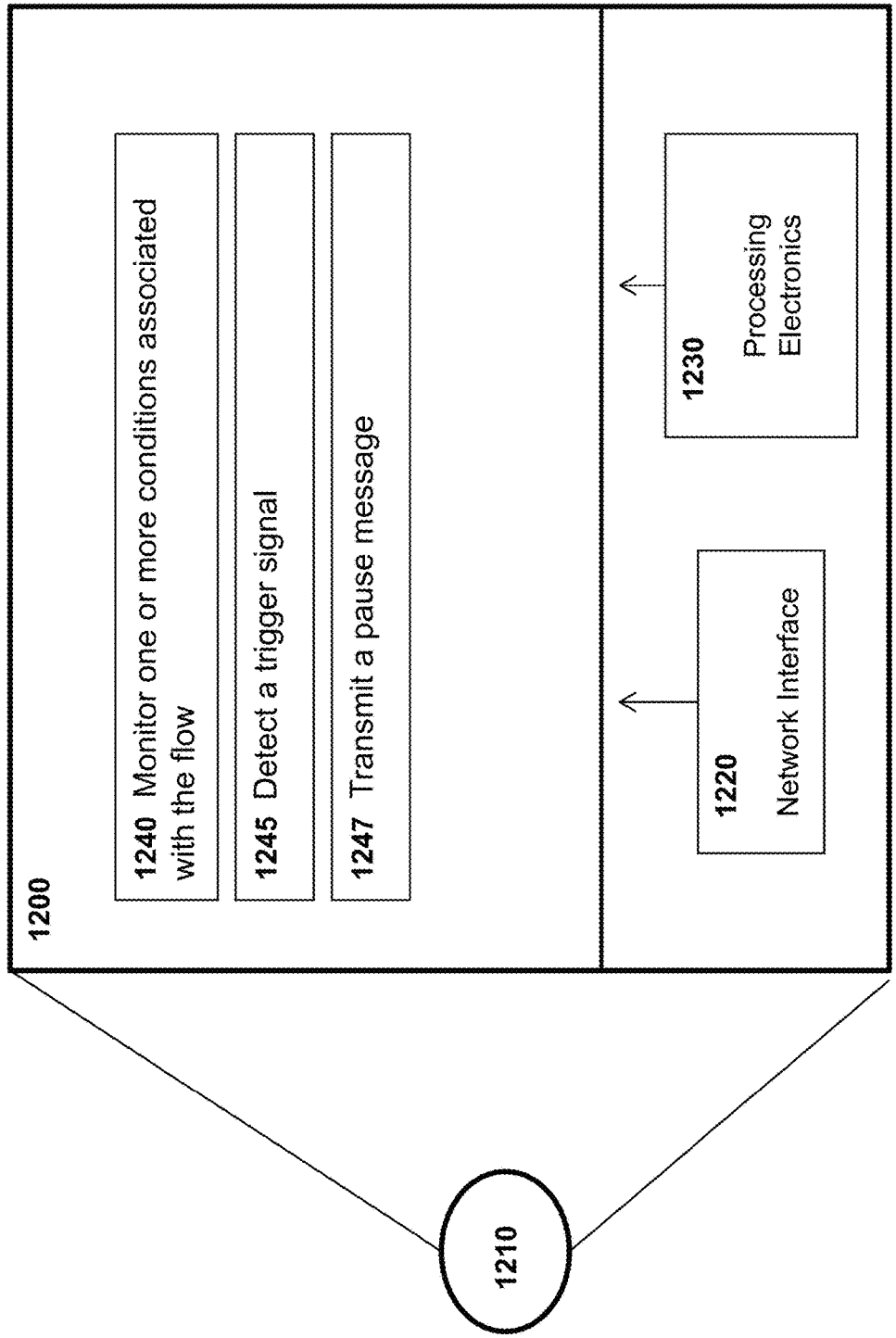
FIG. 12 illustrates an apparatus for proactively forming flowlets for a flow in a communication network, according to embodiments.

FIG. 12 illustrates an apparatus 1200 for proactively forming flowlets for a flow in a communication network, according to embodiments. The apparatus is located at a node 1210 of the network. The apparatus includes a network interface 1220 and processing electronics 1230. The processing electronics can include a computer processer executing program instructions stored in memory, or other electronics components such as digital circuitry, including for example FPGAs and ASICs. The network interface can include an optical communication interface or radio communication interface, such as a transmitter and receiver. The apparatus can include several functional components, each of which is partially or fully implemented using the underlying network interface 1220 and processing electronics 1230. For example, the instructions can result in the apparatus being configured to monitor 1240 one or more conditions associated with the flow, detect 1245 a trigger signal and transmit 1247 a pause message upon the detection of activation of the trigger signal.

Figure 13:
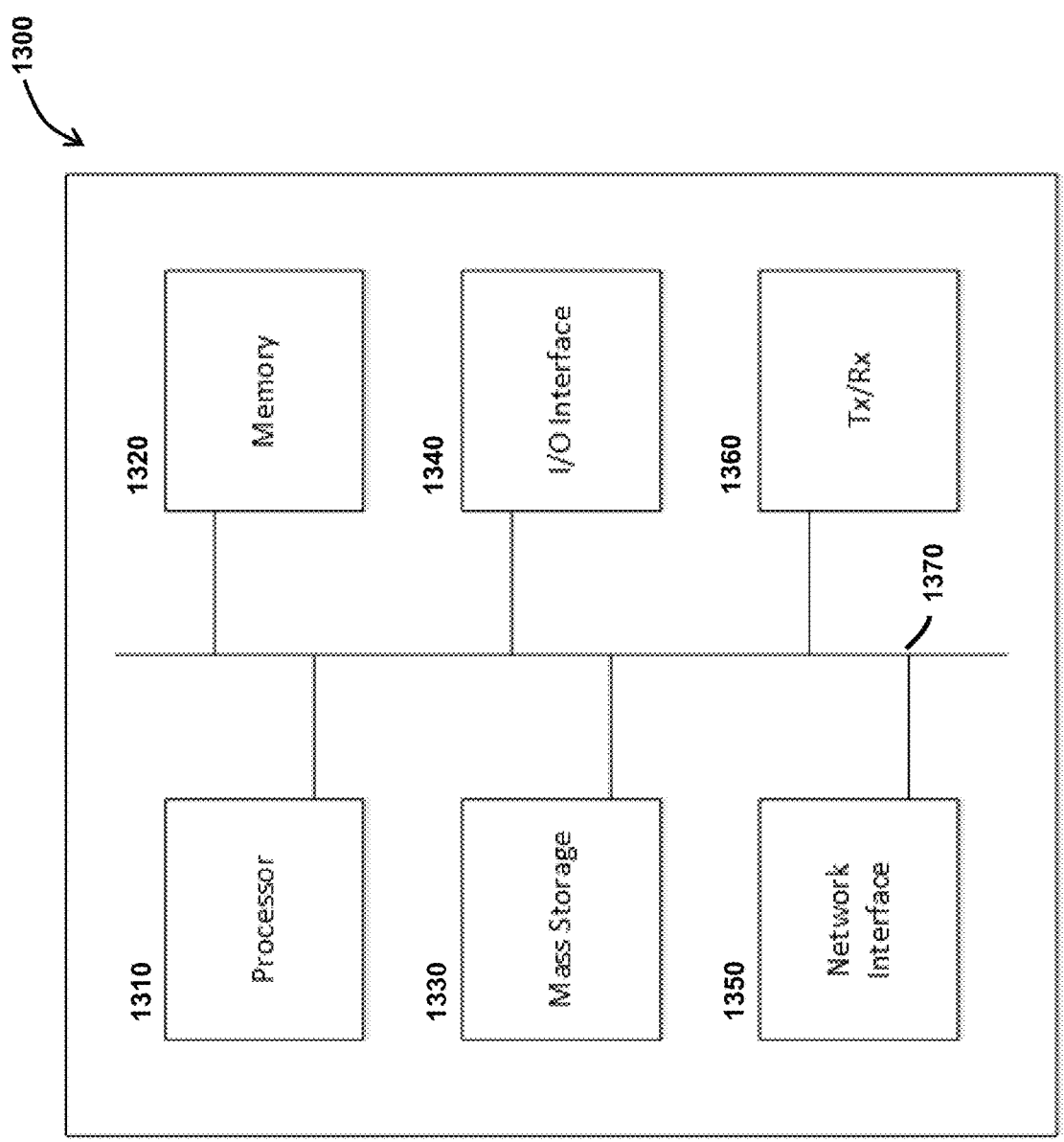
FIG. 13 is a schematic diagram of an electronic device that may perform any or all of operations of a method, according to embodiments.

FIG. 13 is a schematic diagram of an electronic device 1300 that may perform any or all of operations of the above methods and features explicitly or implicitly described herein, according to different embodiments. For example, a computer equipped with network function may be configured as electronic device 1300. The electronic device 1300 may be used to implement the apparatus 1200 of FIG. 12, for example.

As shown, the device includes a processor 1310, such as a central processing unit (CPU) or specialized processors such as a graphics processing unit (GPU) or other such processor unit, memory 1320, non-transitory mass storage 1330, I/O interface 1340, network interface 1350, and a transceiver 1360, all of which are communicatively coupled via bi-directional bus 1370. According to certain embodiments, any or all of the depicted elements may be utilized, or only a subset of the elements. Further, the device 1300 may contain multiple instances of certain elements, such as multiple processors, memories, or transceivers. Also, elements of the hardware device may be directly coupled to other elements without the bi-directional bus. Additionally or alternatively to a processor and memory, other electronics, such as integrated circuits, may be employed for performing the required logical operations.

The memory 1320 may include any type of non-transitory memory such as static random access memory (SRAM), dynamic random access memory (DRAM), synchronous DRAM (SDRAM), read-only memory (ROM), any combination of such, or the like. The mass storage element 1330 may include any type of non-transitory storage device, such as a solid state drive, hard disk drive, a magnetic disk drive, an optical disk drive, USB drive, or computer program product configured to store data and machine executable program code. According to certain embodiments, the memory 1320 or mass storage 1330 may have recorded thereon statements and instructions executable by the processor 1310 for performing any of the aforementioned method operations described above.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM). USB flash disk, or a removable hard disk. The software product includes a number of instructions that enable a computer device (personal computer, server, or network device) to execute the methods provided in the embodiments. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for proactively formula flowlets for a flow in a communication network, the method comprising:
   monitoring one or more conditions associated with the flow;
   detecting a trigger signal; and
   upon detection of activation of the trigger signal, transmitting a cause message that is a priority base flow control (PFC) message including a priority enabled vector (PEV) field, wherein the PEV field is indicative of an active pause duration time suitable for forming flowlets for a flow in a communication network.

2. The method according to claim 1, wherein the trigger signal is at least in part based on congestion detection.

3. The method according to claim 1, wherein the trigger signal is at least in part based on a size of the flow.

4. The method according to claim 3, wherein the size of the flow is evaluated subsequent to flowlet creation.

5. The method according to claim 4, wherein the size of the flow is defined based on a number of packets or a number of bytes.

6. The method according to claim 1, wherein the PFC message includes a time vector, wherein the time vector is indicative of a pause duration.

7. The method according to claim 6, wherein the pause duration is greater than or equal to a flowlet timeout value.

8. A device for proactively forming flowlets for a flow in a communication network, the device comprising:
   a processor;
   a non-transitory memory storing machine executable instructions, which when executed by the processor configure the device to:
   monitor one or more conditions associated with the flow;
   detect a trigger signal; and
   upon detection of activation of the trigger signal, transmit a pause message that is a priority base flow control (PFC) message including a priority enabled vector (PEV) field, wherein the PEV field is indicative of an active pause duration time suitable for forming flowlets for a flow in a communication network.

9. The device according to claim 8, wherein the trigger signal is at least in part based on congestion detection.

10. The device according to claim 8, wherein the trigger signal is at least in part based on a size of the flow.

11. The device according to claim 10, wherein the size of the flow is evaluated subsequent to flowlet creation.

12. The device according to claim 11, wherein the size of the flow is defined based on a number of packets or a number of bytes.

13. The device according to claim 8, wherein the PFC message includes a time vector, wherein the time vector is indicative of a pause duration.

14. The device according to claim 13, wherein the pause duration is greater than or equal to a flowlet timeout value.

15. The device according to claim 8, wherein the device is a top of the rack (TOR) switch.

* * * * *

UNITED STATES PATENT AND TRADEMARK OFFICE
CERTIFICATE OF CORRECTION

| | |
|---|---|
| PATENT NO. | : 12,010,028 B1 |
| APPLICATION NO. | : 18/198357 |
| DATED | : June 11, 2024 |
| INVENTOR(S) | : Amr Adel Nasr Abdelnasser, Xingjun Chu and Amir Baniamerian |

It is certified that error appears in the above-identified patent and that said Letters Patent is hereby corrected as shown below:

In the Specification

Column 2, Line 38:
"As another example. LetFlow" should read --As another example, LetFlow--

Column 11, Line 38:
"selecting the threshold a, the victim" should read --selecting the threshold α, the victim--

Column 11, Line 42:
"The threshold a for sending" should read --The threshold α for sending--

Column 13, Line 19:
"read-only memory (CD-ROM). USB flash" should read --read-only memory (CD-ROM), USB flash--

In the Claims

Column 13, Line 41:
Claim 1, "A method for proactively formula flowlets" should read --A method for proactively forming flowlets--

Column 13, Line 47:
Claim 1, "a cause message that is a priority" should read --a pause message that is a priority--

Signed and Sealed this
Thirteenth Day of August, 2024

Katherine Kelly Vidal
*Director of the United States Patent and Trademark Office*